United States Patent [19]

Sato et al.

[11] 4,289,182

[45] Sep. 15, 1981

[54] PNEUMATIC TIRES FOR LARGE SIZE AND HIGH SPEED MOTORCYCLES

[75] Inventors: Takeshi Sato, Akigawa; Hiroshi Kojima, Hino, both of Japan

[73] Assignee: Bridgestone Tire Company Limited, Tokyo, Japan

[21] Appl. No.: 104,218

[22] Filed: Dec. 17, 1979

[30] Foreign Application Priority Data

Dec. 29, 1978 [JP] Japan .................. 53-162193

[51] Int. Cl.³ .......................... B60C 11/04
[52] U.S. Cl. ................ 152/209 R; D12/141
[58] Field of Search ............ 152/209 R, 209 D; D12/134, 136, 141, 145, 147, 148, 149

[56] References Cited

U.S. PATENT DOCUMENTS

| D. 251,553 | 4/1979 | Sato et al. ................... D12/141 |
| 3,730,245 | 5/1973 | Kusunoki et al. ............ 152/209 R |
| 4,166,490 | 9/1979 | Poque ........................... 152/209 R |

OTHER PUBLICATIONS

Cycle World, Feb. 1975, RE5 vs R90/6 vs Z1B.

*Primary Examiner*—Michael W. Ball

*Attorney, Agent, or Firm*—Sughrue, Mion, Zinn, Macpeak & Seas

[57] ABSTRACT

Pneumatic tires for large size and high speed motorcycles in which a tread extends about a crown of a toroidal carcass along a sectional profile of said carcass from a center of the crown to both sides thereof to such an extent that the tread has a width larger than a maximum width between sidewalls of the tire and at least one circumferential groove is provided at the center portion of the crown. At least two oblique grooves are inclined at acute angles against the circumferential grooves toward the driving force acting when the tires are running, and are provided at each side area defined by the above described central circumferential grooves. The oblique grooves comprise first oblique grooves which extend from said central circumferential groove toward the tread edge and terminate at top ends which do not reach the tread edge and second oblique grooves which extend from a position somewhat outward from the central circumferential groove, in substantially parallel to the first oblique grooves and beyond the top ends of the first grooves toward the tread edge. The area defined by the oblique grooves forms a circumferentially connecting staggering rib.

8 Claims, 3 Drawing Figures

PNEUMATIC TIRES FOR LARGE SIZE AND HIGH SPEED MOTORCYCLES

This invention relates to an improvement of a tread configuration of pneumatic tires for motorcycles and more particularly of pneumatic tires for large size and high speed motorcycles.

Generally, it is known that there is a great difference in running performances, particularly a running performance along a curved course between pneumatic tires for motorcycles and pneumatic tires for four-wheeled vehicles such as passenger cars and the like. That is, pneumatic tires for motorcycles are mainly used under a peculiar service condition. When a large camber angle is given to the wheel or the tire (i.e., the tire is inclined from a plane perpendicular to road surface) in the cornering of the vehicle, a camber thrust produced in the tire (or a force in a direction giving the camber angle and horizontal to road surface) is opposed to a centrifugal force acting to the body of the motorcycle. Thus, such tires have a radial sectional shape where a tread is formed about a crown of a carcass and extends from the center of the crown to both sides thereof along a sectional profile of the carcass to such an extent that the tread has a width larger than a maximum width between sidewalls of the tire. That is, a distance from the carcass line to an outer surface of the tread is actually equal along the profile of the carcass and is concentrically related to a roundness of the profile.

The camber angle given to the tire is frequently within a range of 20°–30° and a noticeably larger camber angle of 40°–45° may be given. Therefore, even if the tire is inclined at such a large camber angle, it is necessary to considerably enlarge a width of the tread to maintain a satisfactory ground contact area of the tire as mentioned above. This is especially true of pneumatic tires for large size motorcycles.

It is known that the running stability, particularly the camber characteristic of the pneumatic tire for motorcycles is largely dependent upon a tread pattern of the tire. Therefore, the tread pattern is required to develop a good camber characteristic to avoid an unstable feeling to a driver in any states at a camber angle range below a given maximum angle. Of course, this fact is required in all weather.

Concerning prior pneumatic tires for motorcycles there have been proposed the following tread patterns. When the camber angle is given to the tire, in the tread portion where is included in the ground contact area, substantially rectangular blocks are arranged on the circumference of the tread in the tire to be mainly used on a dry road, so that the longer sides of the rectangular blocks look toward the axial direction of the tire by taking the camber performance into consideration and substantially rectangular blocks are arranged on the circumference of the tread in the tire to be mainly used on a wet road, so that the longer sides of the rectangular blocks look toward the circumferential direction of the tire, and the circumferential continuity of the grooves extending along the longer sides between the adjacent blocks is not damaged by taking the water discharging ability into consideration.

The present invention is to provide novel type tires suitable for large size motorcycles having a particularly high power and for driving wheels, which are entirely different from the prior conceptions for designing the treads.

The present invention relates to pneumatic tires for motorcycles in which a tread extends about a crown of a toroidal carcass along a sectional profile of said carcass from a center of the crown to both sides thereof to such an extent that the tread has a width larger than a maximum width between sidewalls of the tire and at least one circumferential groove is provided at the center portion of the crown. At least two oblique grooves, inclined at acute angles against the circumferential grooves toward the driving force acting when the tires are running, are provided at one side area defined by the above described central circumferential grooves. The oblique grooves comprise first oblique grooves which extend from said central circumferential groove toward the tread edge and terminate at top ends which do not reach the tread edge and second oblique grooves which extend from a position somewhat distant outward from the central circumferential groove, substantially parallel to the first oblique grooves and beyond the top ends of the first grooves toward the tread edge. The area defined by these oblique grooves forms a circumferentially connecting zigzag rib.

The invention will be explained in more detail with reference to the accompanying drawings, wherein.

Figure 2:
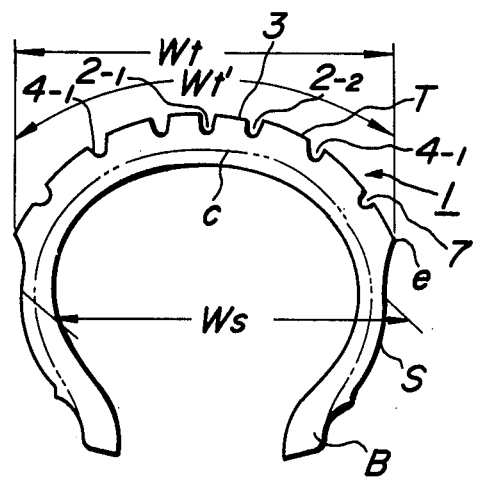
FIG. 2 is a cross-sectional view taken along line A—A in FIG. 1.

In FIG. 2, a numeral 1 is a tire in which both sides of the tread T connect to sidewalls S provided with bead portions B at the top end thereof. A toroidal carcass shown by a profile C is arranged between both bead portions B following the usual manner to reinforce the whole.

The tread T extends from the center of the crown portion of the carcass along the profile C toward the sidewalls S and the tread width (chord) Wt limited by the tread edges e is larger than the maximum width Ws between the sidewalls S.

Such a broad tread width Wt secures the ground contact area necessary when the ground contact center shifts toward the side from the tread center by giving a camber angle to the tire.

The characteristic of the present invention will be described with reference to FIG. 1. The tread T is provided with at least one circumferential groove 2 at the center portion thereof and has first oblique grooves 4-1 extending toward the tread edge e. The circumferential groove 2 in this example comprises a central groove 2-1 on equatorial line O—O of the tire and two central side grooves 2-2 positioned at a some distance at both sides from the center groove.

Accordingly, a pair of circumferential endless ribs 3 are defined by these grooves. In the right half area, the above described first oblique grooves 4-1 is open to the side groove 2-2 and the top ends 5-1 terminate at a position where is somewhat distant from the tread edge.

On the other hand, the second oblique grooves 4-2 start from the position 5-2 which is distant from the circumferential groove 2, in this example, somewhat distant from the side groove 2-2, and extend substantially parallel to the first oblique grooves 4-1 beyond the terminal portions 5-1 toward the tread edge e.

Accordingly, the area defined by these oblique grooves 4-1 and 4-2 form the circumferentially connecting staggered rib 6.

Angles α and β formed by each center line of D—D and E—E showing the direction of each oblique groove of 4-1 and 4-2 and the center line F—F (parallel to the equator O—O) of the circumferentially extending side groove 2-2 are acute and 40°-80°, preferably 45°-75° toward the acting direction of the driving force acting when the tire runs, that is, toward an arrow Ar.

The ends of the oblique grooves 4-2 at the tread edge e side may open at the tread edge, or a shoulder groove 7 can be provided extending circumferentially in parallel to the central groove 2 in the vicinity of the tread edge e as in this example.

However, it is important that the tread has an area Wg (arc) where the oblique grooves 4-1 and 4-2 overlap with one another in the axial direction of the tire, the center of the area Wg being a line Q—Q which is spaced ¼ of the tread width Wt' (arc) measured along the curved surface of the tread, from the edge e.

This area Wg, which is expressed by a width conveniently measured in the axial direction of the tire, is preferred to be 15-75%, more preferably 30-55% of an inner width Wr between the central side groove 2-2 and the shoulder groove 7, which is measured in the axial direction of the tire. Furthermore, Wg is preferred to be at least 0.2 times as long as the sum of the length of the first oblique groove and the second oblique groove.

A circumferential interval between the oblique grooves 4-1 and 4-2 expessed by a pitch length p is 1/40 to 1/60 of the total circumferential length of the tread. The pitch length p may be a variable pitch which is a combination of a plurality of different lengths in a given known manner.

Figure 1:
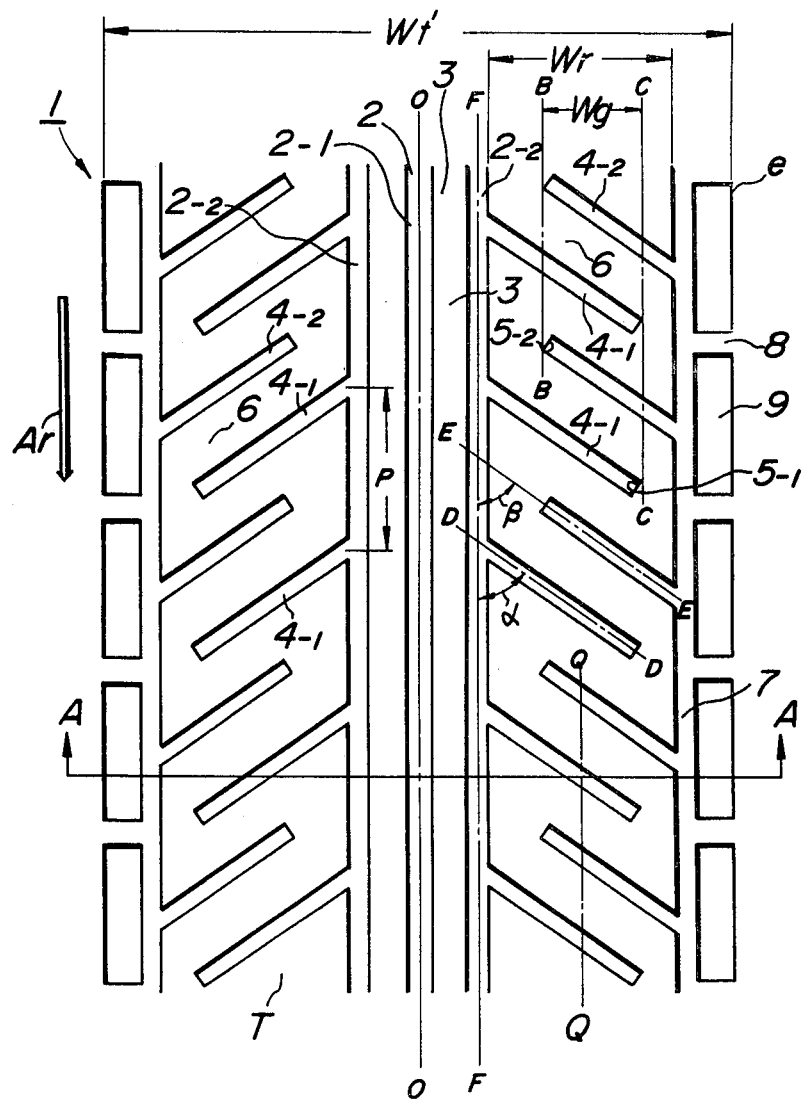
FIG. 1 is a plan view showing the construction of the tread of the tire of the present invention.

When the shoulder grooves 7 are provided as in the example shown in FIG. 1, both outside areas of the tread may be continuous ribs or form blocks 9 formed by arranging a large number of transverse grooves 8 at a given distance as shown in FIG. 1.

In the tire having the tread pattern as shown in FIG. 1, the rib 3 and a slight part of the staggered rib 6 are included in the ground contact area when running straight. When running straight, since only the driving force acts to the ground contact area, the rib 3 running toward the acting direction of the force is the most advantageous in view of the rigidity and the circumferentially arranged grooves 2-1 and 2-2 are highly effective in view of the water discharging ability necessary when running in a high speed.

When a camber angle is given to the tire, the ground contact center shifts from the equator O—O toward the side and a rate of the staggered rib 6 included in the ground contact area increases but the inclination of the staggering rib given by the angles α and β of the oblique grooves substantially looks to a resultant force of the driving force and a camber thrust acting to the direction perpendicular to the acting direction of the driving force. Hence, the necessary rib rigidity can be effectively increased and the water discharging effect also is similarly high.

The side edge blocks 9, when an excessive camber angle is given, serve an auxiliary action.

Figure 3:
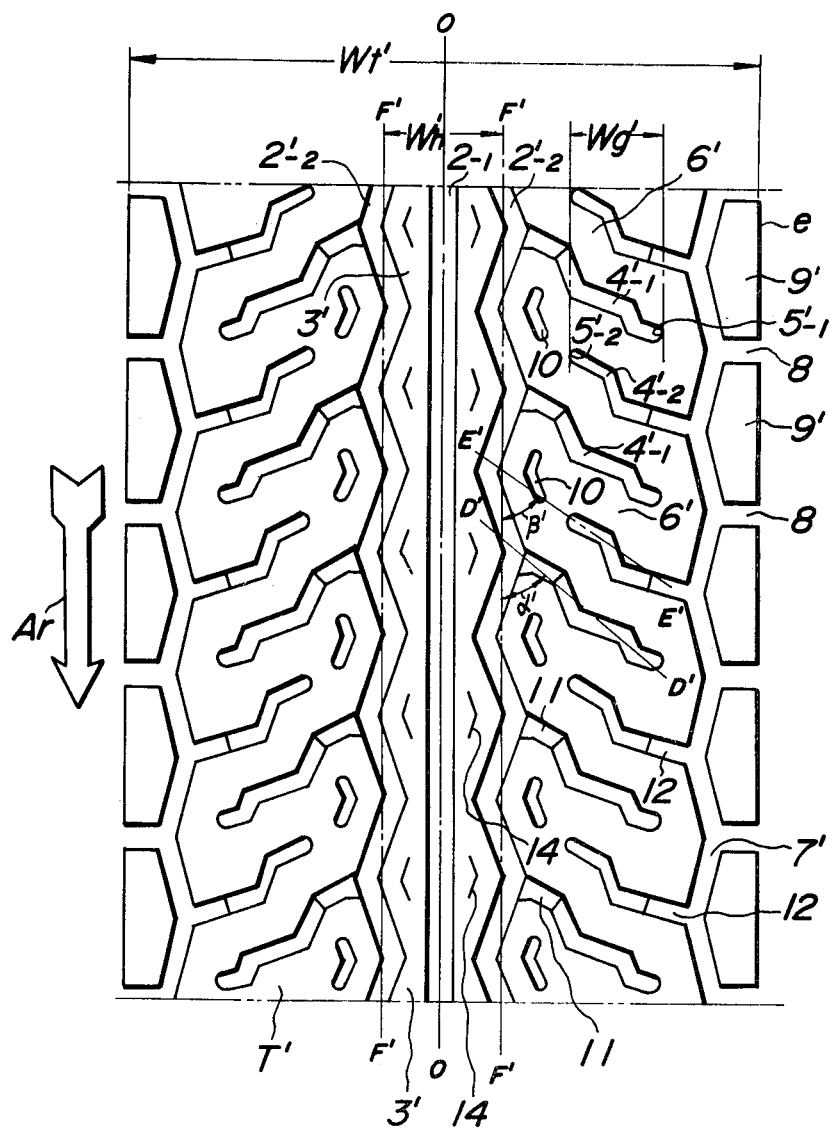
FIG. 3 is a plan view of the tread of a practical embodiment of the present invention.

FIG. 3 shows an embodiment when the above described fundamental pattern is applied to a practical tire.

In this case, a circumferential groove 2-1 provided on an equatorial line O—O of a tire extends straight and is not different from the above described example. But, both side grooves 2'-2 are circumferentially arranged in zigzag form and ribs 3' defined by these three grooves naturally form a zigzag-shape in one side along the groove shape. Discontinuity of the rib rigidity caused by the zigzag shape in one side of the rib 3' is relieved by properly arranging sipes 14.

First oblique grooves 4'-1 and second oblique grooves 4'-2 similarly show a modified zigzag shape or a wave shape and at parts opening to the circumferential grooves 2'-2 and the shoulder grooves 7' are provided somewhat projected platforms 11 and 12 respectively. The height of the platform is designed corresponding to about 21% of the depth of the grooves.

At positions where the staggering ribs 6' bend at the terminal portions 5'-2 of the second oblique grooves, small grooves 10 are provided in order to make the fitness of the tread T' to the road better and to improve the water absorbability on the wet road.

Angles α' and β' formed by center lines D'—D' and E'—E' of the first oblique grooves 4'-1 and the second oblique grooves 4'-2 and center lines F'—F' of the side grooves 2'-2 are 50° and 55° respectively. A width W'g where both the oblique grooves overlap, corresponds to 30% of the sum of the lengths of the first oblique groove 4'-1 and the second oblique groove 4'-2 repectively measured in the directions of the center lines D'—D' and E'—E'.

When a pair of side grooves 2'-2 are provided as in this example, a center distance W'h of both the grooves is preferred to be 10%-25% of the tread width W't (arc) and small grooves 10 or sipes 14 may be additionally provided on the staggering ribs 6' and blocks 9' defined by zigzag shoulder grooves 7' and transverse grooves 8 may be variously modified by varying these groove shapes.

The tires according to the present invention are particularly suitable for large size, driving wheels and high speed motorcycles and can provide the straight running performance and curved running performance at high speeds which have never been obtained and develop a high slip resistance at rainy weather.

What is claimed is:

1. A pneumatic tire for motorcycles comprising, a tread extending about a crown of a toroidal carcass along a sectional profile of said carcass from a center of the crown to both sides thereof to such an extent that the tread has a width larger than a maximum width between sidewalls of the tire, said tread including a circumferential center groove located at the equatorial center line of the tread, a pair of circumferential central side grooves located adjacent and symmetrically on each side of said center groove, a pair of circumferential shoulder grooves located at shoulder portions adjacent to tread edges, circumferential ribs divided by said center groove and said central side grooves, and a pair of staggered ribs defined by said central side grooves, said staggered ribs having bending portions, said shoulder grooves and oblique grooves, said oblique grooves comprising first oblique grooves extending from said central side grooves toward the tread edges and terminating at top ends which do not reach the tread edges, and second oblique grooves which extend from shoulder grooves toward the central side grooves and terminate at top ends which do not reach the central side grooves and substantially parallel to the first grooves, each center line of said first and second oblique grooves inclined at an angle of 40° to 80° with respect to the center line of each central side grooves, bottoms of first oblique grooves at parts opening to each of the central side grooves and bottoms of the second oblique grooves at parts opening to each of the shoulder grooves are formed with projected platforms respectively, each bending portion of each staggered rib adjacent to the central side groove provided with a small groove aligned in parallel with the central side groove, and a pitch length defined by a circumferential interval between first oblique grooves is in the range of 1/40 to 1/60 of the total circumferential length of the tread.

2. Pneumatic tires as claimed in claim 1, wherein the first oblique grooves and the second oblique grooves overlap with one another in an axial direction of the tire and a center of the overlapped area is distant from edge of the tread substantially ¼ of the tread width measured along the curved surface of the tread.

3. Pneumatic tires as claimed in claim 1 or 2, wherein the width of the overlapped area of the first oblique grooves and the second oblique grooves corresponds to at least 0.2 time as long as the sum of the length of the first oblique groove and the second oblique groove.

4. Pneumatic tires as claimed in claim 1, wherein the first oblique grooves open to the central side grooves.

5. Pneumatic tires as claimed in claims 1, 2, 3 or 4, wherein the second oblique grooves open at said shoulder grooves.

6. Pneumatic tires as claimed in claim 5, wherein an area defined by the shoulder grooves and the tread edges is provided with blocks defined by a large number of transversal grooves arranged circumferentially at an interval.

7. A pneumatic tire as claimed in claim 1 wherein the height of said platforms corresponds to approximately 21% of the depth of said oblique grooves.

8. A pneumatic tire as claimed in claim 1 wherein said first and second oblique grooves are inclined at an angle of 45°–75° with respect to the center line of each central side grooves.

* * * * *